United States Patent
Kristjansson (10) Patent No.: US 7,827,297 B2
(45) Date of Patent: Nov. 2, 2010

(54) MULTIMEDIA LINKING AND SYNCHRONIZATION METHOD, PRESENTATION AND EDITING APPARATUS

(76) Inventor: Trausti Thor Kristjansson, 6573 Autumn Cove, Orlando, FL (US) 32822

( * ) Notice: Subject to any disclaimer, the term of this patent is extended or adjusted under 35 U.S.C. 154(b) by 1750 days.

(21) Appl. No.: 10/346,705

(22) Filed: Jan. 18, 2003

(65) Prior Publication Data

US 2004/0143673 A1   Jul. 22, 2004

(51) Int. Cl.
*G06F 15/16* (2006.01)
(52) U.S. Cl. .................... 709/231; 709/248; 725/40; 725/41; 725/47; 348/95
(58) Field of Classification Search ............... 725/40, 725/41, 47; 709/321, 231, 248; 348/95
See application file for complete search history.

(56) References Cited

U.S. PATENT DOCUMENTS

| | | | | |
|---|---|---|---|---|
| 5,481,296 | A * | 1/1996 | Cragun et al. | 725/136 |
| 5,574,905 | A * | 11/1996 | deCarmo | 707/1 |
| 5,703,655 | A * | 12/1997 | Corey et al. | 348/468 |
| 5,805,153 | A * | 9/1998 | Nielsen | 725/37 |
| 5,892,506 | A * | 4/1999 | Hermanson | 715/500.1 |
| 6,055,495 | A | 4/2000 | Tucker | |
| 6,654,030 | B1 * | 11/2003 | Hui | 715/720 |
| 6,701,014 | B1 * | 3/2004 | Syeda-Mahmood | 382/199 |
| 2002/0087999 | A1 * | 7/2002 | Kashima | 725/100 |
| 2004/0064831 | A1 * | 4/2004 | Abbott et al. | 725/1 |
| 2004/0125124 | A1 * | 7/2004 | Kim et al. | 345/716 |

OTHER PUBLICATIONS

Kristjansson, Trausti, "A Unified Structure Based Framework for Indexing and Gisting of Meetings", Proceedings of IEEE International Conference on multimedia computing and Systems, 1999, vol. 2, pp. 572-577.

Fujikawa, Kazutoshi et al., "The Synchronization Mechanisms of Multimedia Information in the Distributed Hypermedia System Harmony," Proceedings of the 1st International Conference on MultiMedia Modeling, Nov. 1993, pp. 275-289, Singapore.

Yahya Al-Salqan et al."Temporal Relations and Synchronization Agents" IEEE Multimedia, Jun. 1996, pp. 30-39.

Ferris, Ralph, "HyTime Application Development Guide" Distributed on internet, first appeared May 12, 1995.

* cited by examiner

*Primary Examiner*—Thuong T Nguyen
(74) *Attorney, Agent, or Firm*—Scully, Scott, Murphy & Presser, P.C.

(57) ABSTRACT

A method for associating segments within various media such as text, audio and video is described. A system for navigating and presenting such media is presented. Additionally, a system for defining the segment locations and the associations between them is presented. A method for assisting the user when specifying the segment boundaries is described, which employs the output from automatic media analysis.

3 Claims, 12 Drawing Sheets

```xml
<?xml version="1.0" encoding="UTF-8"?>
<!DOCTYPE HMMLfile SYSTEM "C:/samples/hmml.dtd" >
<HMMLfile>
  <MediaLocations>
    <MediaFile streamID="T1" filename="ManyToMany.htm"
        directory="file://localhost/C:/samples/" type="eXHTML"/>
    <MediaFile streamID="V1" filename="25allt.avi"
        directory="file://localhost/C:/samples/" type="video"/>
  </MediaLocations>
  <MediaLinks>
    <hub hid="h1" level="2">
      <link sid="V1" id="1L2" />
      <link sid="T1" id="1L2" />
    </hub>
    <hub hid="h2" level="1">
      <link sid="V1" id="1L1" />
      <link sid="T1" id="1L1" />
      <link sid="T1" id="2L1" />
      <link sid="T1" id="3L1" />
    </hub>
    <hub hid="h3" level="1">
      <link sid="V1" id="5L1" />
      <link sid="V1" id="6L1" />
      <link sid="T1" id="3L1" />
      <link sid="T1" id="4L1" />
    </hub>
    ...

</MediaLinks>
  <StreamResources sid="V1">
    <StreamTarget id="1L2"><VideoRegion level="2"
       StartFrame="20" EndFrame="304"/></StreamTarget>
    <StreamTarget id="1L1"><VideoRegion level="1"
       StartFrame="22" EndFrame="40"/></StreamTarget>
    <StreamTarget id="2L1"><VideoRegion level="1"
       StartFrame="44" EndFrame="61"/></StreamTarget>
    <StreamTarget id="3L1"><VideoRegion level="1"
       StartFrame="62" EndFrame="77"/></StreamTarget>
    ...

</StreamResources>
</HMMLfile>
```

FIG.9

```
                <center>
                <h1><lb lev="1" tid="1L1"/>Links:<lb lev="1"
                tid="1L1"/></h1>
                </center>
1002 ─────── <lb lev="2" tid="1L2"/>
           ┌─ This <lb lev="1" tid="2L1"/>document
1004 ─────┤   <le tid="2L1"/> <lb lev="1"
1006 ─────┘   tid="3L1"/>illustrates<le tid="3L1"/> the
              different <lb lev="1" tid="4L1"/>linking<le
              tid="4L1"/> possibilities of the new<lb
              lev="1" tid="5L1"/> linking<le tid="5L1"/>
              <lb lev="1" tid="6L1"/> scheme
              <le tid="6L1"/>.
1008 ─────── <le tid="1L2"/> ...
```

FIG.10

MULTIMEDIA LINKING AND SYNCHRONIZATION METHOD, PRESENTATION AND EDITING APPARATUS

CROSS-REFERENCE TO RELATED APPLICATIONS

Not Applicable

FEDERALLY SPONSORED RESEARCH

Not Applicable

SEQUENCE LISTING OR PROGRAM

A CD-ROM is attached

BACKGROUND OF THE INVENTION

1. Field of Invention

The invention relates to the representation, presentation and navigation of multimedia.

2. Background of the Invention

Sign language such as American Sign Language is the preferred means of communication for many deaf people. Written language e.g. written English is therefore a second language that must be learned as a second language.

It is difficult if not impossible to effectively transcribe sign language monologs or dissertations onto paper. However, sign language can easily be recorded onto video. For the purpose of instructing deaf people in the use of written language, and instructing hearing people in the use of sign language, it is desirable to associate signs in sign language to written language. The most basic association between text and sign language is a one-to-one association of a word and a sign. However, it is desirable to use more complex associations such as multiple text segments to single or multiple video sequences, and to allow multiple levels of association, e.g. at the word level, phrase level, sentence level, paragraph level etc.

Such instructional material can be provided by means of video tapes with associated books. The use of such material is severely limited due to the difficulty of synchronization and association of words and phrases in the text to video sequences and vice versa. Another disadvantage is the difficulty of navigating the material, e.g. finding particular paragraphs or words in the video.

With the advent of computers capable of displaying multimedia content, it is possible to show video on a computer terminal as well as text. Multimedia-computer technologies such as the SMIL (Synchronized Multimedia Integration Language) specification developed by the W3C and Flash™ from Macromedia Corporation can be used to create material where the text is displayed synchronously with the video recording of the sign language dissertation.

Although these technologies provide some support for navigation of the video and association of signs to text, they do not support slightly more complex relationships between written language and sign language, such as when multiple non-adjacent words relate to a single video sequence and vice versa. It does not represent the underlying groupings of words and video segments into meanings or concepts.

These multimedia technologies do not provide an efficient way of associating multiple texts and multiple videos. An example of associating multiple texts and multiple videos is to associate a video dissertation in Spanish Sign Language to a video dissertation in American Sign Language, and the semantically equivalent English and Spanish texts. Such associations are invaluable for instruction in foreign languages.

Thus, the currently available multimedia technologies do not provide a method for describing the required relationships, for editing these descriptions or for presenting the material.

The specification of segments of text, or text targets, is relatively simple because text provides segment boundary indicators such as spaces that delimit words, punctuation that delimit sentences and paragraph markers that delimit paragraph boundaries. In audio/video media, such segment boundary indicators are not available from the media itself. This makes the specification of segments a slow and labor intensive-process.

OBJECTS AND ADVANTAGES

The present invention includes a new method for linking sub regions or segments within various computer based media such as XHTML (Extensible HyperText Markup developed by the W3C), video and audio. The new method allows for navigating between the various media, as well as a synchronization mechanism, by which, a plurality of media can be presented in a unified manner. The underlying linking method is based on defining segments in the media, herein called targets, and defining nodes, herein called hubs, and then defining associations between the targets and the hubs. The various media in conjunction with the description of the links between these media, comprise a new type of multimedia document.

The invention allows for the creation of a new type of multimedia content that is especially useful for linking text and sign-language video. However invention has a variety of other applications, such as the synchronized presentation and navigation of media relating to university lectures, seminars, court proceedings etc. It can also be used to associate subtitles with movies and audio (e.g. karaoke).

A user of the system can view and play back the new media in a presentation application (i.e. computer program) and the links and targets can be defined and edited in an editing application. The presentation application allows the user to click a segment in the text, for example a word or an image, video or audio. If the clicked word is linked to video or audio segments, then these segments are presented. The editing application facilitates the definition of the targets and hubs and the specifying of links between them. The editing application facilitates the definition of the targets by means of a visual alignment bar, where alignment points are predicted by audio and video analysis methods.

Audio/video analysis methods exist that can predict the positions of boundaries in audio/video data. An example of such analysis is the detection of word and sentence breaks in spoken audio. Another example is the detection of low activity in videos of sign language dissertations, which indicate phrase boundaries. A further example is the detection of scene transitions in amateur videos. Such analysis method are often based on probabilistic methods, i.e. the methods predict the occurrence of a boundary at a specific time point with a probability between 0 and 1. Although such analysis methods are notoriously inaccurate for most tasks, they can be of great value in assisting a user in adjusting the boundary points of audio/video segments or targets.

The objects and advantages of the present invention are:

(a) to provide a mechanism that associates audio and video material and textual material and supports groupings of words and video sequences that relate to the underlying concepts.

(b) to provide a mechanism that associates audio and video and text segments at multiple levels, e.g. word, phrase, sentence or for different purposes.

(c) to provide a mechanism that associates segments within two or more video sequences and two or more texts.

(d) to provide a mechanism that associates audio/video material and textual material and allows navigation from elements or segments in one medium to the other.

(e) to provide structured and efficient computer readable description of these relationships.

(f) To provide a method for synchronously playing the media, and allowing the user to play one of the time-based media and view the associated segments in the other media.

(g) To provide a mechanism for the user or content creator to easily designate the segments within the media and specify the associations between these segments.

(h) To provide assistance to the user in specifying the exact location of the boundaries of media segments.

Further objects and advantages of my invention will become apparent from a consideration of the drawings and ensuing description.

SUMMARY

The present invention provides a method for associating segments within multiple sources of audio/video media and text. The association method allows the grouping of multiple segments reflecting a conceptual unit. The grouping is supported by using nodes called hubs that link to segments.

The invention provides a system that can be used to navigated the media and to play the media in a synchronized fashion. The system also provides the user with an interface for defining the segments within the various media and for assigning the links between. When defining the boundaries of segments the user is assisted by means of segmentation indicators. The segmentation indicators are provided by automatic media-analysis methods.

DRAWINGS

Figures

FIG. 9 is an example of hub, link and target description format.

DRAWINGS

Reference Numerals

102 Central processing unit (CPU)
104 Memory
106 Disk store
108 Network
110 Display terminal
122 Control and synchronization unit
124 Media Presentation Units for Text
126 Media Presentation Units for Video
128 Link creation and Target editing Unit
130 Media Analysis Unit
202 Text area
204 Highlighted text segment
205 Highlighted text segment
206 Button bar
208 Window title bar
302 Move to beginning button
304 Play button
306 Move to end button
308 Move to previous target button
310 Play current target button
312 Play next target button
314 Loop-play current target button
316 Play next target button
318 Target play buttons
320 Media play controls
322 Caption or subtitle box
324 play rate control
326 Window title bar
328 Menu bar
330 Video window
402 Text Media bar
404 Video Media bar
406 Hub bar
408 Window title bar
410 Selected hub
412 Delete selected button
414 Add new hub button
416 Delete links button
418 Add links button
420 Level 3 button
422 Level 2 button
424 Level 1 button
426 Add media button
428 Linking mode button
430 Target editing mode button
432 Play mode button
434 Hub
436 Time ruler
438 Level 2 target
440 Level 1 target
441 Level 1 target
442 Selected target in text bar
444 Link between hub and target on text bar
452 Media alignment bar
456 Segmentation indicator or Segmentation probability line
472 Alignment bar with segmentation indicators
474 Alignment bar with segmentation indicators
476 Alignment bar with segmentation indicators
478 Segmentation indicator 902 Media Location Block: specification of media properties and locations
904 Media location specification tag for eXHTML media
906 Media links Block: specifies hubs and links
908 Hub block
910 Link tag specifies a target to which the hub is linked
912 Stream Resource Block: specifies location targets in audio/video media.
914 StreamTarget tag: specifies start and end of a target.
1002 Level 2 Target beginning XML tag
1003 Level 1 Target beginning XML tag
1006 Level 1 Target ending XML tag
1008 Level 2 Target ending XML tag

DETAILED DESCRIPTION

The present invention will now be described in detail with reference to a preferred embodiment thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

Figure 1A:
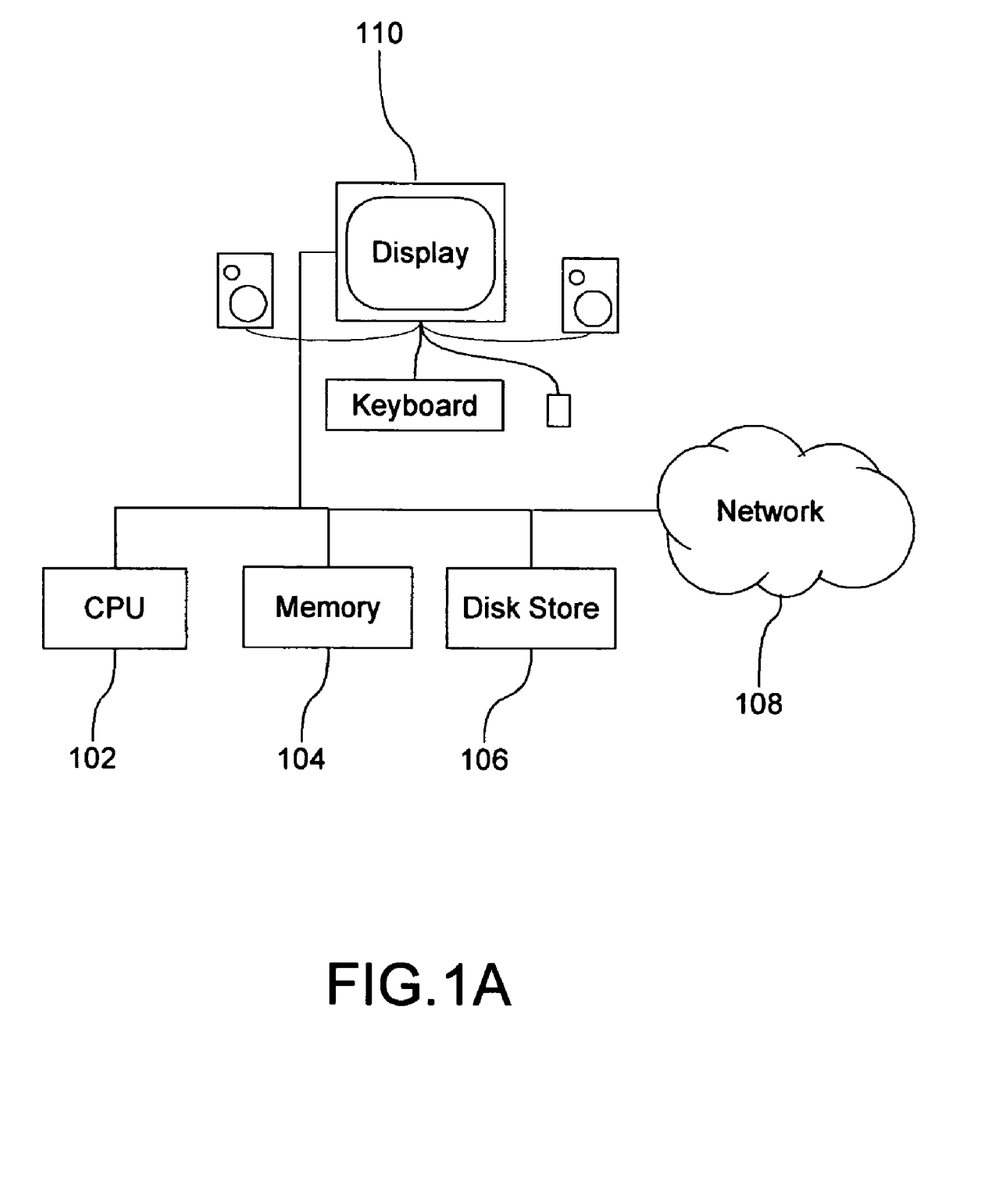
FIG. 1A is a block diagram of conventional multimedia computer system.

FIG. 1A shows a conventional multimedia computer which the system controls. The invention can also control other hardware, such as telephone terminals, Personal Data Asistants (PDAs) cell phones with displays etc. The multimedia computer is comprised of a Central Processing Unit (CPU) (102) connected to a memory store (104), a display terminal (110), with an input device such as keyboard, and/or a mouse and/or a touch screen. Optionally the system can have an external disk store (106), speakers and a connection to the web (108) or wireless network.

Figure 1B:
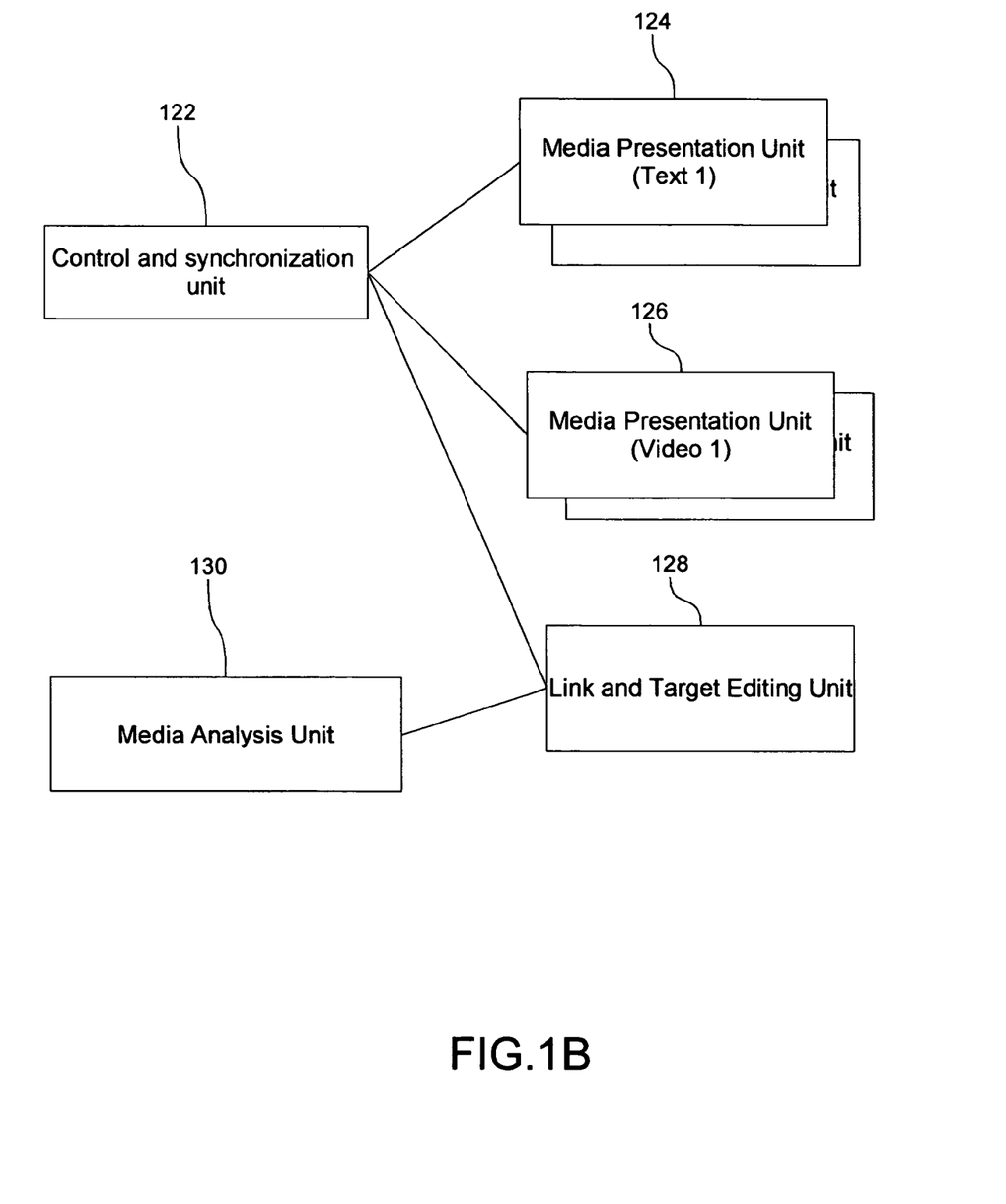
FIG. 1B is a block diagram of the units of the system and their interrelations.

FIG. 1B shows the units of the software. When the software has been loaded into the computer store, the control and synchronization unit (122) holds the description of the links and media targets. FIG. 9 shows such a description. This is a new XML compliant format herein called HMML. The media presentation units (124 and 126) hold either text media e.g. in a new format herein called extended XHTML format (see FIG. 10) or audio/video media e.g. in WAV or MPEG format. The media presentation units also hold the specification of the position of the segments or targets in the media. A media presentation application requires only these units, i.e. the Control and Synchronization unit and one or more Media Presentation Units.

An editing application (i.e. computer program) requires additionally a Link and Target Editing Unit (128). The link and target editing unit (128) holds a copy of the link specification, including the hubs, targets and the links between them. The Media analysis unit (13) holds segmentation probabilities for the media in the audio video presentation units.

Figure 2:
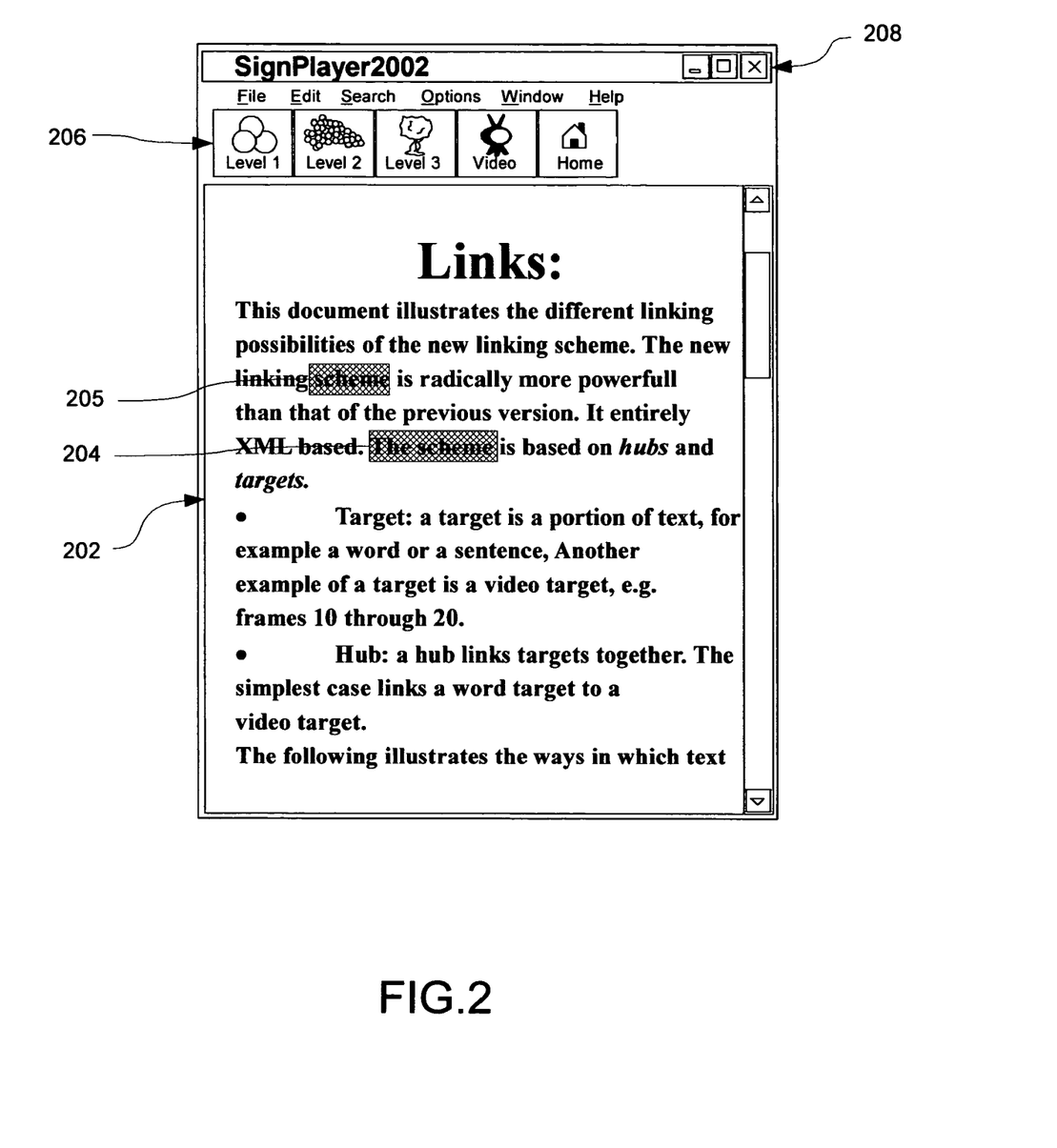
FIG. 2 is a picture of the Text presentation window.

FIG. 2 shows the visual representation on a computer screen of a Media Presentation Unit for textual media. In this case the media is text media in extended XHTML format. The eXHTML is presented in the text area (202). Two text segments (204, 205) are highlighted i.e. the background color has been changed. The Toolbar provides buttons that change the level, open the video display etc.

Figure 3:
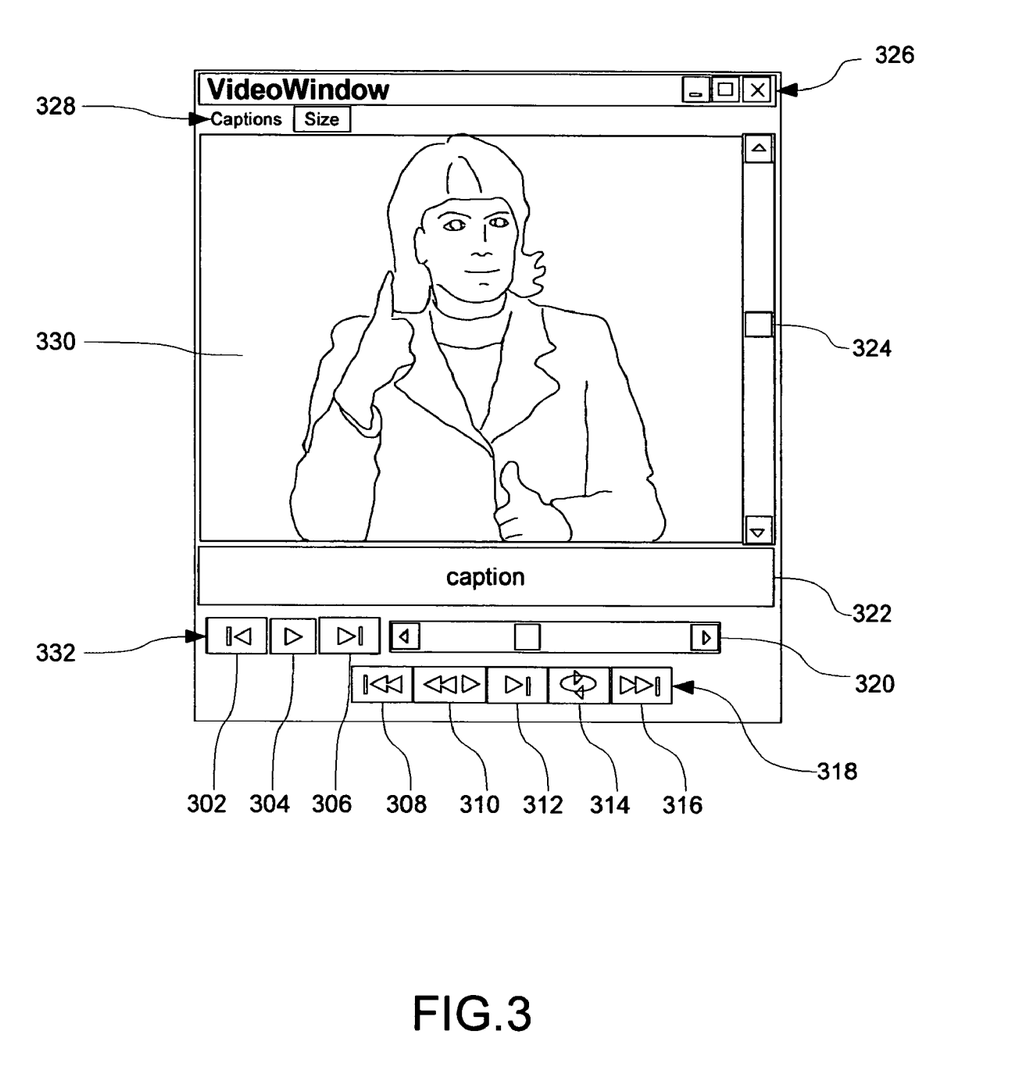
FIG. 3 is a diagram of the Video presentation window.

FIG. 3 shows a visual representation on a computer screen of a media presentation unit for video media. In this case the media is video media e.g. MPEG video. The video window (330) shows the video. The media control bar (332) hold media position and playing controls. The target playing bar (318) holds target play controls.

The Link and Target editing unit provides controls both for creating and adjusting the position of targets, and for defining links between targets and hubs.

Figure 4:
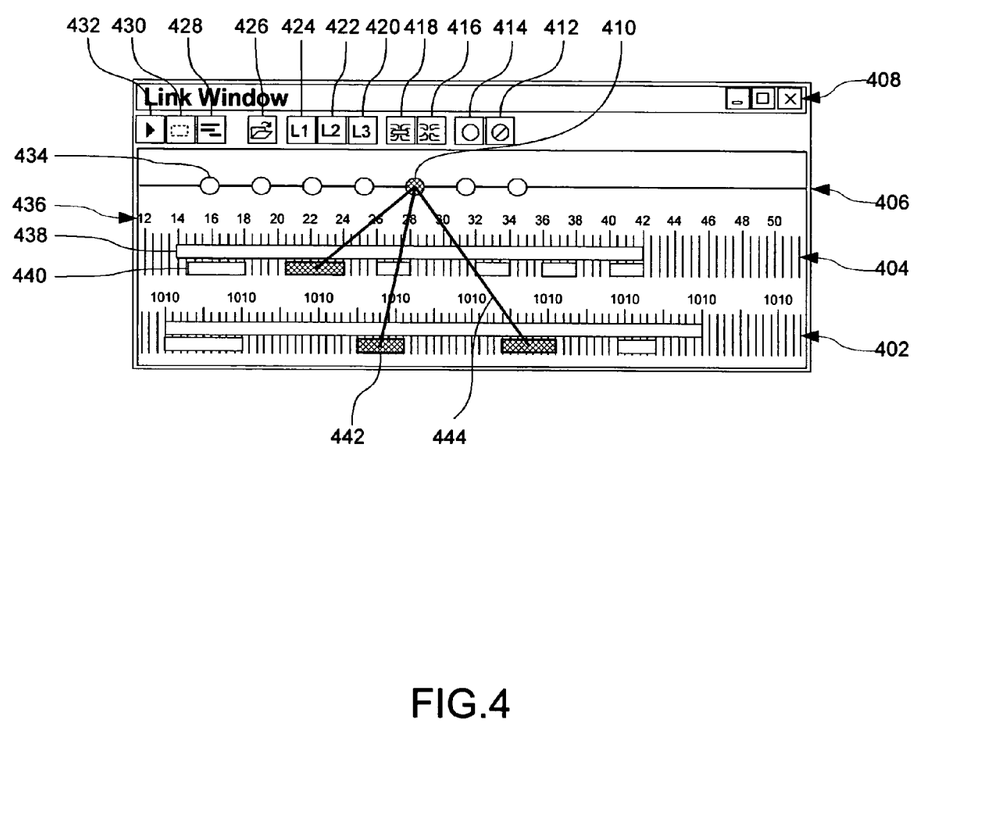
FIG. 4 is a diagram of the media linking window showing the hub bar, two media bars.

FIG. 4 Shows a visual representation on a computer screen of the Link and Target Editing unit when it is in linking mode. The display shows a Hub bar (406) a Media Bar (404) for video, and a media bar for text (402). More Media bars can be displayed as required. The hub bar (406) has a number of hubs (e.g. 434). Each media bar contains target bars (e.g. 440) at different levels and a time ruler (e.g. 436) that shows the position within the media. For example, the target (440) is a target on level 1 starting at time 14.5 and ending at time 18 and the target (438) is a target at level 2 starting at time 14 and ending at time 42. The figure shows that a selected hub (410) is linked to one target in the video media and two targets in the text media.

Figure 4A:
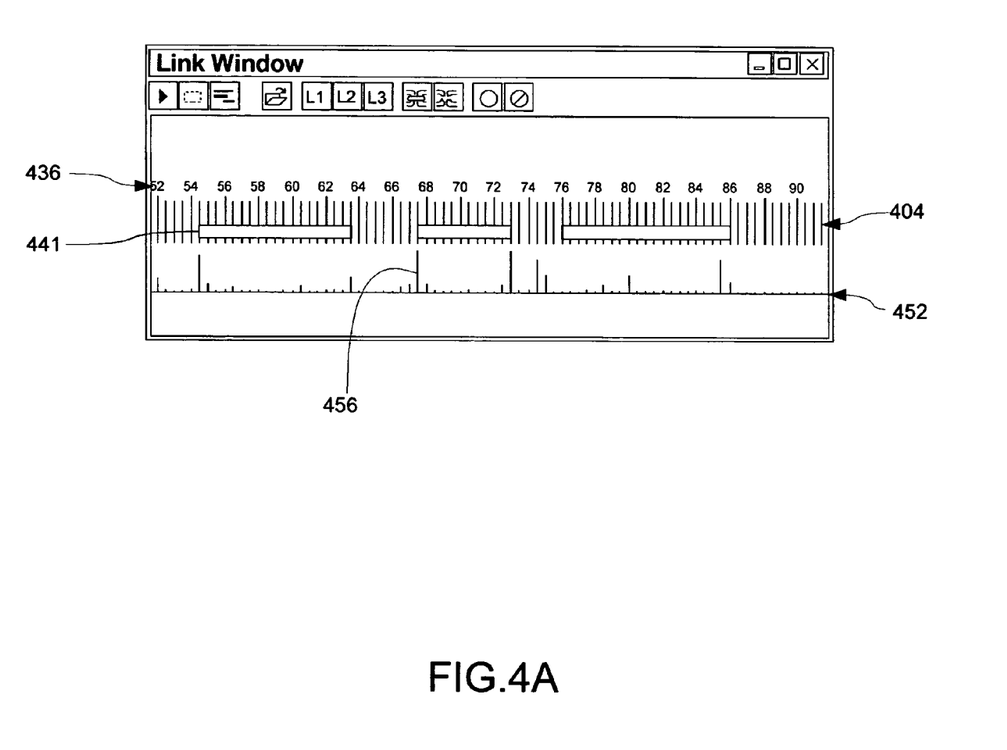
FIG. 4A is a diagram of the media linking window in segment editing mode.

FIG. 4A shows the Link and Target editing unit in Target editing mode. The target alignment bar (452) is shown below the Video Media bar (404) and the other bars are temporarily hidden. The Alignment bar (452) presents a series of vertical lines called Segmentation Indicators or Segmentation Probability Lines (456). The height of the segmentation probability lines (456) on the target alignment bar (452) is relative to the probability that there is a segment boundary at that point in time. High bars represent points in the media where a high probability or certainty exists that there is a segment boundary at that point. The time and probability values are provided by the Media analysis unit (130).

Figure 4B:
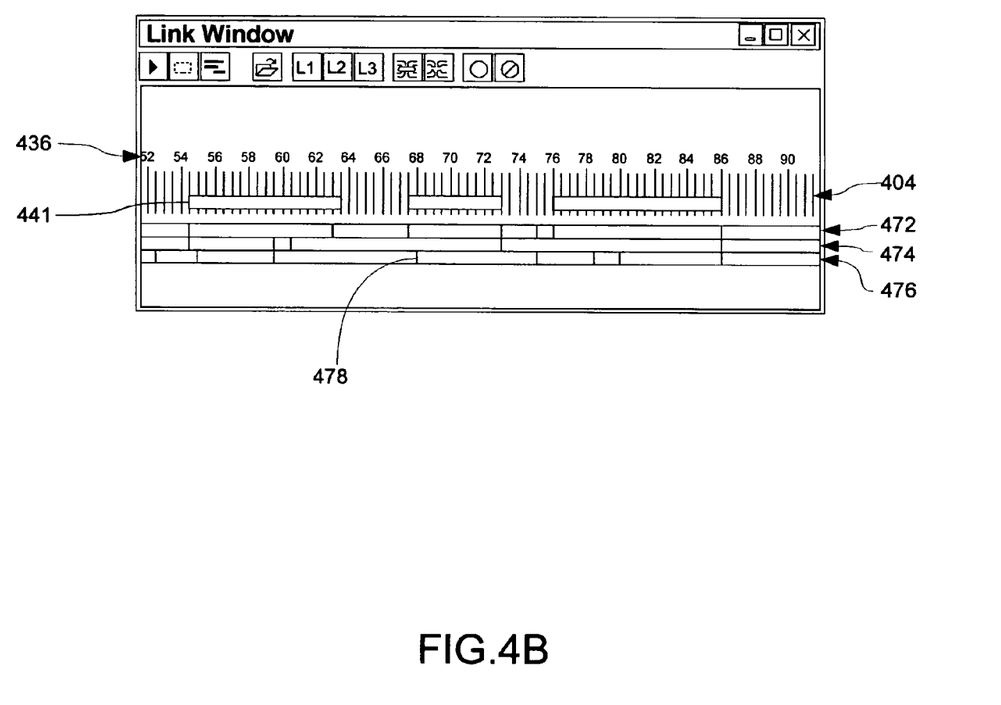
FIG. 4B shows an alternate embodiment of the Alignment Bar.

A second embodiment of the Alignment bar is shown in FIG. 4B, where multiple analysis methods have been used. For example the segmentation indicators in the top most bar (472) are based on speech recognition, the segmentation indicators in the middle bar (474) are based on prosody analysis (i.e. the analysis of pitch, strength, and rhythm of speech) and the segmentation indicators in the bottom bar (476) are based on video analysis.

FIGS. 5, 6, 7 and 8 show flowcharts that will be discussed in a following section.

The description of the hubs, targets and links is stored in computer readable format. An example of such a description file, called an HMML file is shown, in FIG. 9. The file has a number of sections or blocks. The first block (902) is enclosed in a <MediaLocations> . . . </MediaLocations> tag pair. This block contains the location and other properties of the media streams. The media can be stored on a local disk store, or can be streamed from a location on the network. The next block is the MediaLinks block (906). This block contains the hub descriptors (908). Each hub descriptor contains a list of link tags (910). The link tags identify the targets that the hub is linked to.

Each StreamResources block (912) contains information about the target locations in a particular media. An example of such a target specifier is (914). This StreamTarget tag contains a VideoRegion tag that specifies the start and end time for the target in stream "V1" with identity "1L2".

Figure 10:
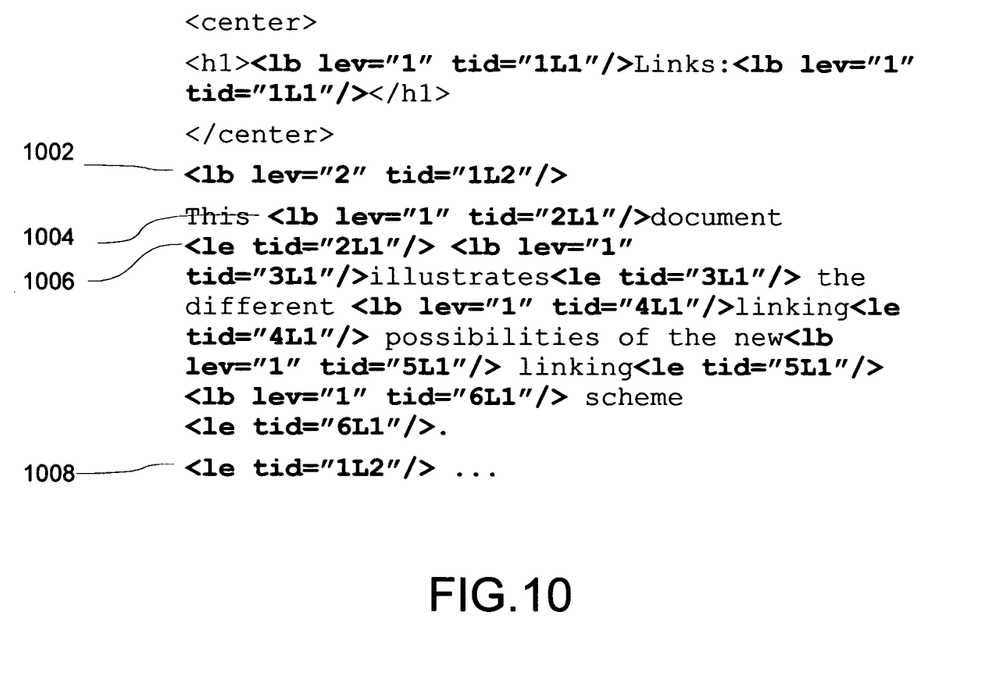
FIG. 10 is an example of the an XHTML file extended with the new segment or target specifiers.

In text media, it is convenient to embed the target specifiers in the XHTML itself. FIG. 10 shows eXHTML text with target specifiers. The eXHTML contains starting and ending tag pairs. The text <lb lev="2" tid="1L2"/> is a starting tag (1002) of a target on level 2 with identity "1L2". The end of tag (1008) of the target is at the bottom of the figure (<le tid="1L2"/>). Hence, all the text and markup between these two tags constitute the target with identity "1L2".

Operation

Navigation Mechanism:

The user can navigate the media by clicking a target in the eXHTML text. Linked segments or images (if present) will be highlighted and linked video targets will be played. Similarly, clicking on the video presentation screen (330) causes other Media Presenters to play or highlight the appropriate targets.

Synchronization Mechanism:

One of the media streams, such as a video media stream or an audio media stream, provides a time base and is called the Timekeeper. The user chooses which Media Unit takes the role of Timekeeper, and the other Media Units then take a subservient role. Any of the temporal media can be timekeepers.

Text is traditionally not thought of as a temporal media. However, text can be read, which is a basis for a temporal aspect of text. By assigning a specific time to each letter in each word in sequence, a temporal component can be added to the text to allow a text Media Presentation Unit to be the timekeeper.

Figure 5:
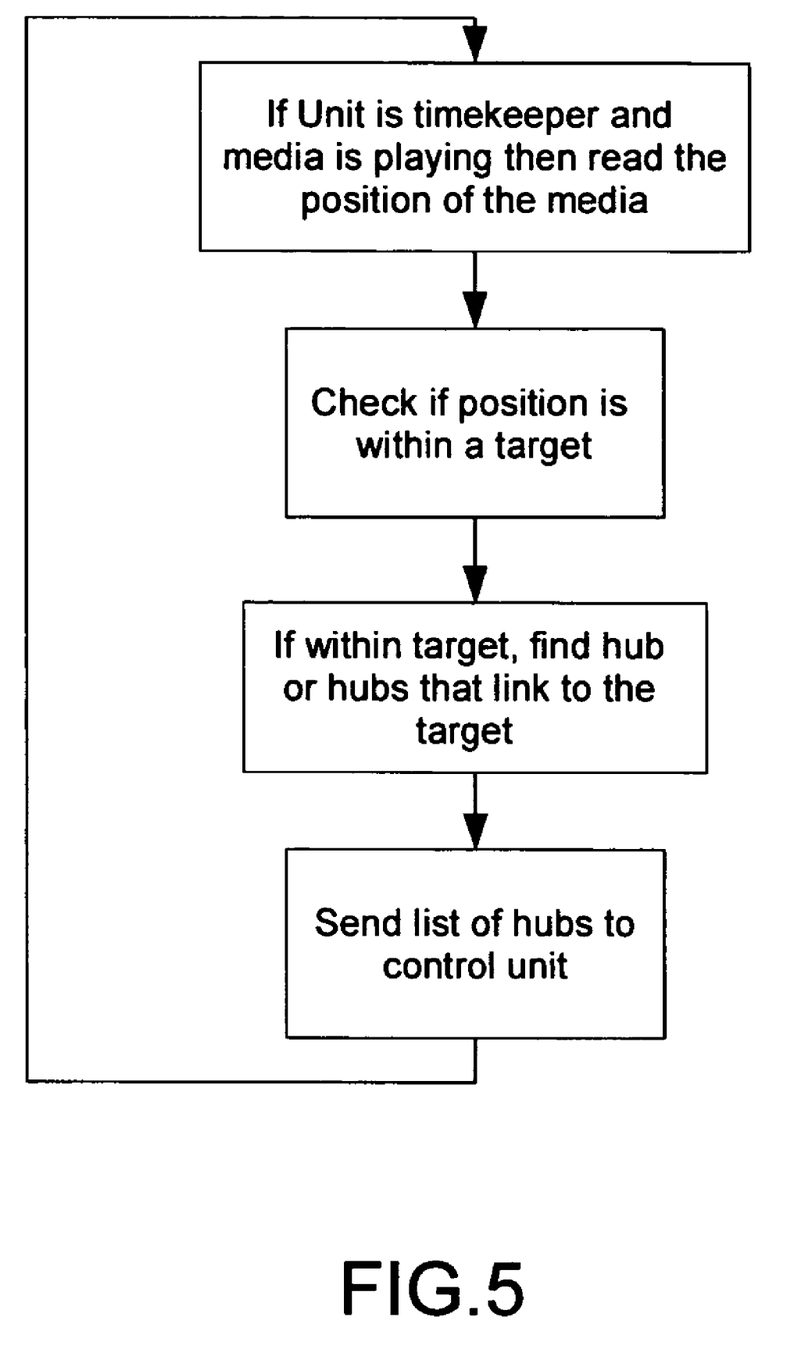
FIG. 5. is a flowchart of the synchronization event generation mechanism of a Timekeeper Media Unit.

Function of Timekeeper Media Unit:

A target in temporal media has a beginning time and an ending time. When the playing position of the timekeeper media is between the beginning time and ending time of a target, a synchronization event is triggered which is propagated to all the subservient Media Units. A flowchart of the operation of the Timekeeper Media Unit is shown in FIG. 5.

The MediaUnit searches for the hub or hubs that link to the target. A list of all targets to which the hubs link is compiled. This list contains media identifier and target identifier pair. The list is sent to the Control and Synchronization Unit.

Figure 6:
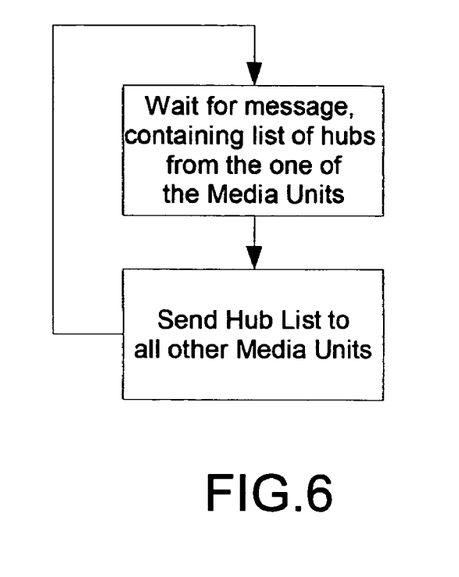
FIG. 6 is a flowchart of the synchronization passing mechanism of the Control and synchronization unit.
Figure 7:
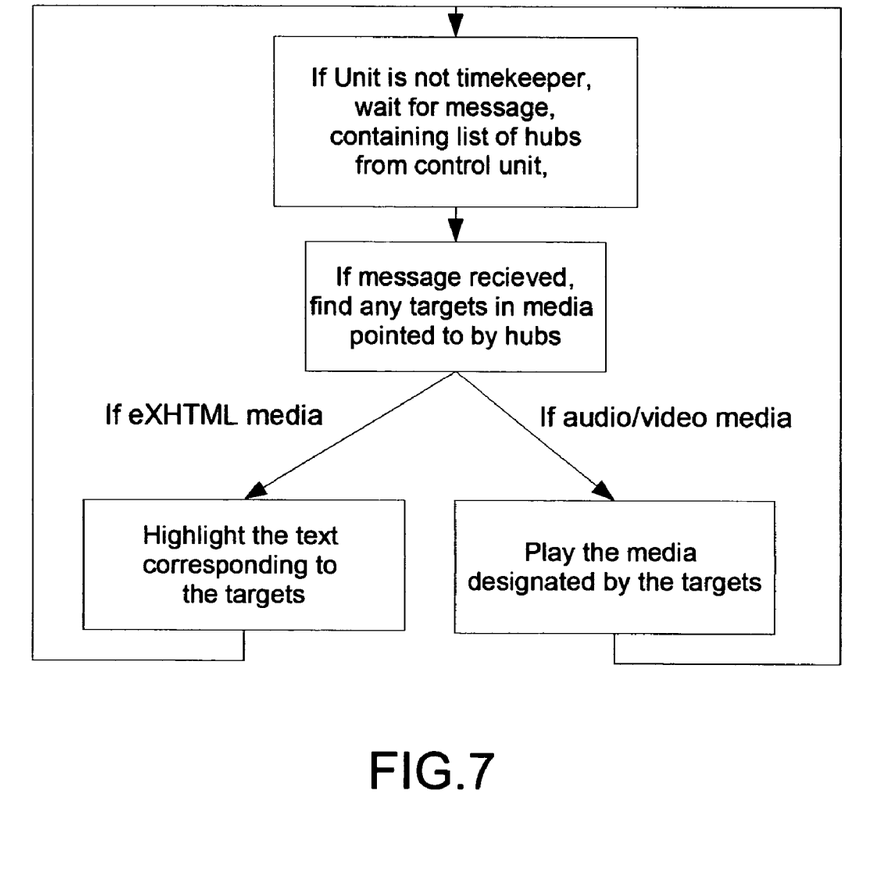
FIG. 7 is a flowchart of the synchronization mechanism of a Media Unit that is not a Timekeeper.

The Control and Synchronization Unit then sends the list to all other Media Presentation units. A flowchart of the operation of the Control and Synchronization unit is shown in FIG. 6.

On receiving such a list form the Control and Synchronization Unit, each Presentation Unit positions its media to display or play the appropriate targets. If the media unit is a text presentation unit, then it highlight the specified target text segments and scrolls them into view. If the media unit is an audio/video unit then it plays the specified audio/video segments. A flowchart of the operation of the Control and Synchronization unit is shown in FIG. 6.

The effect of the playing of audio/video media is that text segments in the eXHTML presentation window will be highlighted when an associated video target is encountered, and de-highlighted when the video target is no longer active, i.e. when the position of the timekeeper is no longer within the boundaries of the video target.

There are two ways to play temporal media (e.g. video or audio media) in the subservient media units. The first method is to play it at its natural rate, and start the playing at the same point in time as when the target is encountered in the timekeeper. A second method is possible if both the originating target and destination targets are temporal media. In this case, the temporal media can be played at a rate such that it will finish playing at the same instant as the play position in the timekeeper passes the end boundary of the active segment.

It is also possible to use a timekeeper without audio or video. Such a timekeeper has all the properties of a regular temporal media, but does not display audio or video.

Defining and Editing of Hubs, Targets and Links

The Link and Target Editing Unit (128) and its visual representation FIG. 4, FIG. 4A and FIG. 4B. provide the user with an interface to define hubs, targets and links. To create a new hub, the user clicks on the hub bar, or presses the New hub button (414). To connect targets, the user selects the targets by clicking on them, and then presses the Link button (418). To create a link, the user can also click a target or hub and drag to another target. To remove connection between a hub and a target, the user select the hub and the target and presses the Remove Links button (416). The Link and Target Editing unit makes the corresponding changes to the HMML description (See FIG. 9), by adding or deleting <hub> tags and <link> tags.

To define a new target, (FIG. 4A) the Link and Target Editing Unit is first set into Target Editing mode. This is done by clicking the Target Editing button (428). The user clicks and holds the mouse on the corresponding media bar at the start point, and drags the mouse pointer to the end point of the new target. As the user drags the mouse, the endpoint of the target follows the mouse pointer. The Link and Target Editing unit makes the corresponding changes to the HMML description.

To assist the user in adjusting the end and/or start points of a target, the Alignment bar (452) is provided. The alignment bar presents a representation of segment boundary times and their corresponding probabilities, as provided by the media analysis unit.

To align the start or end point of a target to a segmentation probability line, the user selects the beginning or end boundary of a target, by clicking on it in the Media Bar (454) and then moving the mouse pointer. The boundary of the target is adjusted to the position of the mouse pointer along the direction of the media bar. To align to segmentation probability line, the user moves the mouse pointer into the region of the alignment bar. The start or ending time of the target may be adjusted to a Segment Probability Line (456), while the position of the mouse pointer will not be effected. The procedure for determining if the boundary should be aligned with a segmentation probability line is shown by the flowchart in FIG. 8.

Figure 8:
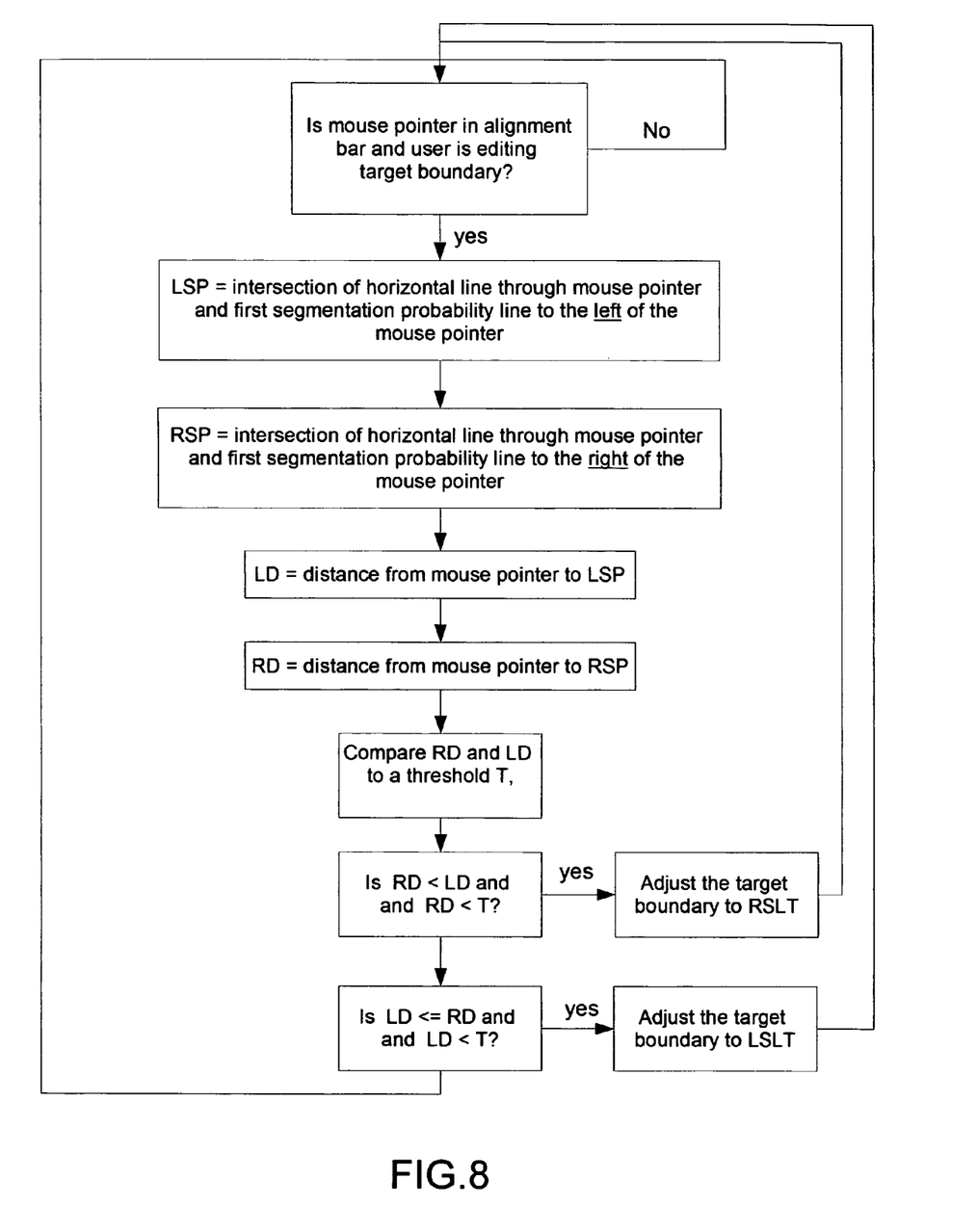
FIG. 8 is a flowchart of the segment or target alignment mechanism.

First the LSP (Left Section Point) and RSP (Right Section Point) are found. The LSP is the intersection of a horizontal plane through the mouse pointer and the closest segmentation probability line to the left of the mouse pointer. The time associated with the closest Segmentation Probability Line is called the LSLT. The RSP is the intersection of a horizontal plane from the mouse pointer and the closest Segmentation Probability Line to the right of the mouse pointer. The time associated with the closest segmentation probability line is called the RSLT.

Based on these two distances and the probability values associated with the two segmentation probability lines, the system finds whether to adjust the boundary to the LSLT or the RSLT or to adjust it to the horizontal position of the mouse pointer. One embodiment of this procedure is shown in FIG. 8. RD is the distance from the mouse pointer to the RSP and LD is the distance from the mouse pointer to the LSP. If the RD is smaller LD and smaller than a threshold T then the target boundary is adjusted to the right, i.e. to RSLT. If LD is smaller RD and smaller than the threshold T, then the target boundary is adjusted to the left, i.e. to LSLT. If both LD and RD are larger than T, then the target boundary follows the mouse pointer.

If the mouse pointer is at a high position in the alignment bar, the horizontal plane will only intersect with segmentation probability lines with high weight or probability. By varying the vertical position of the mouse pointer, the user chooses the minimum weight required for adjusting the target boundary to a Segmentation Probability Line.

A second embodiment is shown in FIG. 4B. In this embodiment, one or more media analysis methods are used to produce segment identifiers. The Segment indicators produced by each analysis method are presented on a separate horizontal area or bar (e.g. 472). In this case, the user chooses between the methods by varying the vertical position of the mouser pointer.

A person knowledgeable in the art will see various methods for taking into account the weights associated with the segmentation indicators. The weights can e.g. be used so that a segmentation indicator with large weight or probability has a stronger attraction than a segmentation indicator with lower weight.

Advantages

The hub-target structure is clearly more general than directly linking targets in different media, since direct linking can be accomplished in the hub-target structure by linking any two targets in a target-hub-target triple.

There are distinct advantages to using the hub-target structure. One advantage is synergy with underlying conceptual structure of language. A hub can be connected to multiple non-adjacent text segments and multiple non-adjacent video segments. The group of targets connected to the hub constitute a conceptual unit. Another advantage is the efficiency this allows when connecting multiple texts or multiple videos. As an example, if a sign language discourse and the corresponding text have been linked, one can add a third text in another language more easily than is possible without the hub-target structure. This is because the target in the new text needs only to be connected to a hub. If only direct links were supported, two connections would be required: first a connection to a target in the video discourse, then a second connection to a target in the other text. The advantage of the hub-target structure becomes more pronounced as more languages are added. A third advantage is the implementational simplicity that the intermediate hubs allow by grouping link specifications with the hubs.

Defining target boundary positions manually for large amounts of data can be very time consuming and tedious. Fully automatic segmentation methods based on probabilistic methods are notoriously prone to errors. The use of media analysis in the context of an Alignment Bar as shown in FIG. 4A and FIG. 4B is therefore of great value since it makes the manual task of defining segment boundaries much faster than without the alignment bar, but avoids the errors of a fully automatic segmentation method.

Conclusion Ramifications and Scope

The reader will see that the linking scheme and presentation and synchronization method described above is highly valuable for producing material for the instruction of language such as sign-language.

There are various other applications of linking different media as described above. One applications is the presentation of voice mail associated with text or a graphical substitute for text. The presentation terminal can be either standard PC, PDA or a cell phone. A second example is the addition of narration to presentations such as PowerPoint™ presentations (PowerPoint™ is developed by Microsoft Corporation). Lecture notes and passages within textbooks can be synchronized with video taped lectures. Similarly, the transcriptions of parliamentary proceedings can be synchronized with the video taped proceedings.

The boundary alignment method based on automatic analysis can be used in other applications, such as nonlinear video editing systems.

Although the description above contains many specificities, these should not be construed as limiting the scope of the invention but merely providing illustrations of some of the presently preferred embodiments of this invention. For example, it is clear to a person knowledgeable to the field that the underlying linking structure can be described in a variety of different computer readable formats.

Thus the scope of the invention should be determined by the appended claims and their legal equivalents, rather than by the examples given.

I claim:

1. A method of synchronizing and presenting a plurality of media on a terminal, comprising:
   (a) providing a plurality of media,
   (b) providing a repository for said plurality of media,
   (c) providing a terminal which is able to present said plurality of media,
   (d) providing a plurality of segments within said plurality of media,
   (e) providing a plurality of nodes operable to associate one or more segments in the plurality of media, each segment in the plurality of media operable to be associated with more than one node in the plurality of nodes, a node with associated one or more segments forming a hub-target structure in which segments linked to a common node are capable of being presented simultaneously,
   (g) providing a repository controller operable to send simultaneously said segments related by said nodes to said terminal, said terminal further operable to present said segments simultaneously;
   providing an input device for specifying a timekeeper media selected from said plurality of media,
   said repository controller operable to:
     (1) read said timekeeper media and when an active segment in the timekeeper media is read,
     (2) produce a subset of nodes that are linked to said active segment and,
     (3) produce a subset of segments that are linked to said subset of nodes,
     (4) present the media of said timekeeper and,
     (5) simultaneously present said subset of segments,
   wherein said active segment in the timekeeper media being read triggers a synchronization event propagated to said subset of segments linked to said subset of nodes and a user is allowed to experience said subset of segments associated with said active segment as said timekeeper media is presented.

2. A method as recited in claim 1, comprising:
   (a) providing an input device for at least choosing a designated node, selected from said plurality of nodes,
   (b) said repository controller further operable to present segments linked to said designated node,
   whereby a user will experience said segments associated with said node.

3. A method as recited in claim 1, comprising:
   (a) providing an input device for choosing a designated segment, selected from said plurality of segments,
   (b) said repository controller further operable to:
     (1) produce a subset of nodes where each component node in said subset is linked to said designated segment,
     (2) present segments linked to said subset of nodes.

* * * * *